United States Patent
Turgeman et al.

(10) Patent No.: US 7,581,228 B2
(45) Date of Patent: Aug. 25, 2009

(54) UTILIZING SERVICE INFORMATION IN DIGITAL VIDEO BROADCASTING

(75) Inventors: Shlomo Turgeman, Ramat Efal (IL); Nachum Panich, Ramar Gan (IL)

(73) Assignee: VBox Communications Ltd., Herzliya (IL)

( * ) Notice: Subject to any disclaimer, the term of this patent is extended or adjusted under 35 U.S.C. 154(b) by 785 days.

(21) Appl. No.: 10/890,189

(22) Filed: Jul. 14, 2004

(65) Prior Publication Data

US 2006/0015913 A1 Jan. 19, 2006

(51) Int. Cl.
*G06F 13/00* (2006.01)
(52) U.S. Cl. .................. 719/321; 719/323; 719/324
(58) Field of Classification Search ............... 719/321, 719/323, 324
See application file for complete search history.

(56) References Cited

U.S. PATENT DOCUMENTS

| | | | | |
|---|---|---|---|---|
| 5,909,559 A | * | 6/1999 | So | 710/307 |
| 6,105,119 A | * | 8/2000 | Kerr et al. | 711/219 |
| 6,179,489 B1 | * | 1/2001 | So et al. | 718/102 |
| 6,298,370 B1 | * | 10/2001 | Tang et al. | 718/102 |
| 6,717,596 B1 | * | 4/2004 | Nason et al. | 715/788 |
| 6,952,236 B2 | * | 10/2005 | Orr | 348/465 |
| 2005/0086501 A1 | * | 4/2005 | Woo et al. | 713/189 |

* cited by examiner

*Primary Examiner*—Andy Ho
(74) *Attorney, Agent, or Firm*—Dekel Patent Ltd.; David Klein

(57) ABSTRACT

Apparatus and methods for utilizing service information (SI) in digital video broadcasting (DVB), such as for Internet related actions.

8 Claims, 2 Drawing Sheets

UTILIZING SERVICE INFORMATION IN DIGITAL VIDEO BROADCASTING

FIELD OF THE INVENTION

The present invention relates generally to digital video broadcasting (DVB), and particularly to utilizing service information (SI) in DVB, such as for Internet related actions.

BACKGROUND OF THE INVENTION

Digital video broadcasting (DVB) signals include the video and audio components of broadcast content, as well as other information. For example, a receiver of a digital transmission needs control data for its technical function, such as so-called "Packet_Identifiers" (PID) among others, so that when the Packaged Elementary Streams (PES) are demultiplexed from the received transportation stream, the compressed video or audio data contained therein can be functionally assigned. These control data are transmitted as "sections" in the so-called Program Specific Information (PSI), which may be expanded in accordance with the service provider's needs by means of additional sections, so-called "Private-Sections".

This expansion is used in the DVB system. In that way the DVB signals also transmit Service Information (SI) in addition to the program specific information (PSI). Throughout the specification, the term SI encompasses any kind of information additional to the video and audio content, such as but not limited to, the service information and PSI. The service information (SI) contains technical transmission data and particularly describes the Program Elementary Streams (PES) according to origin and content. This makes it possible to automatically tune the receiver for the desired service and provides a user-friendly guide through the variety of the transmitted services by means of an electronic program guide (EPG).

In accordance with certain standards, for example, the PSI data and SI data are transmitted in the same form. Thus a transport multiplexer serially transmits data packets with elementary video streams, elementary audio streams and data streams with PSI or SI data, in a sequence with variable limits.

For example, in accordance with certain standards, both the PSI and the SI data may be arranged in the form of tables and subtables of different lengths. The SI tables use the syntax of the PSI standards and contain so-called "descriptors" to describe the contents and the transmission data. The contents of the SI tables can differ depending on the service provider. A significant component is the included information about services and their contribution to the programs, so-called "events" of the received distributor network and from other distributor networks. For example, by means of so-called SDT "Service Description Tables" they contain data for a more detailed description of the individual services, such as among other things the name of the service and the provider, the type of service and its national or regional availability.

TV viewers do not generally concern themselves with SI, and merely enjoy the video and audio content of the broadcast.

SUMMARY OF THE INVENTION

The present invention seeks to provide apparatus and methods for utilizing service information (SI) in digital video broadcasting (DVB), such as for Internet related actions, as is described more in detail hereinbelow.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1:
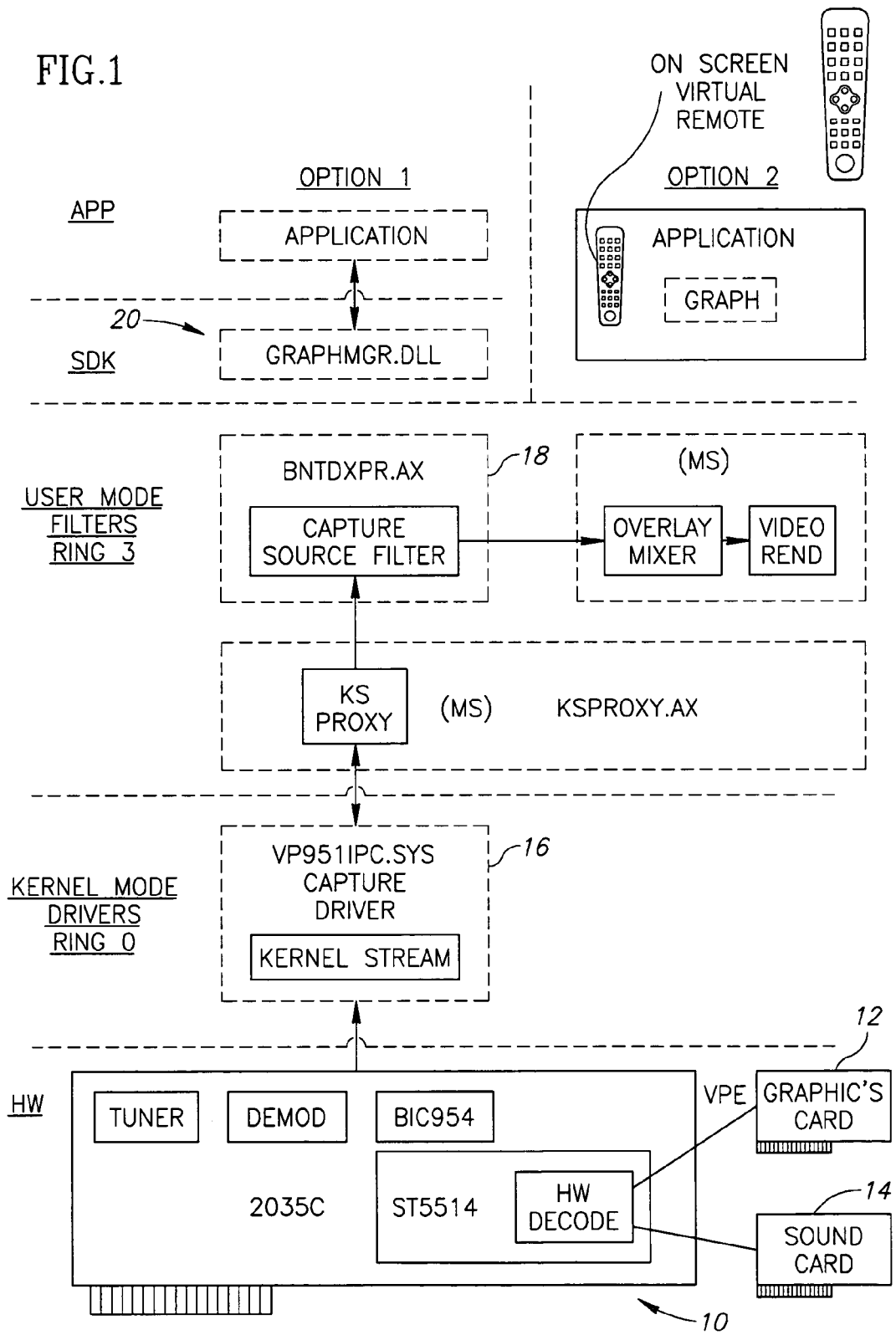
FIG. 1 is a simplified block diagram illustration of apparatus and methods for utilizing SI in DVB, in accordance with an embodiment of the present invention.

Reference is now made to FIG. 1, which illustrates apparatus and methods for utilizing SI in DVB, in accordance with an embodiment of the present invention.

Hardware 10 may be provided for receiving DVB. The hardware 10 may include, without limitation, a set-top box (STB) chip (e.g., ST5514) with STB functionality, a tuner, a demodulator and a chip interface (e.g., BiC951 from Vbox Communications Ltd., Netanya, Israel). Of course the invention is not limited to an STB chip and may be carried out with a standalone STB unit connected to a TV, or may alternatively comprise an STB printed circuit board (PCB) with STB functionality. STB functionality may include, without limitation, subscriber information and access capability, and decoding (or even encoding) capability. Various memories may be provided for the function of the system, such as but not limited to, static or dynamic random access memories or flash memories.

The video and audio content of the DVB is parsed by the hardware 10 (and/or software). The video/audio content may be sent to a graphics PCB 12 and sound PCB 14, respectively.

The data contained in the SI of the DVB may be extracted, processed, routed and then used for different applications, such as but not limited to, graphic applications. In the illustrated embodiment, the data is extracted by a capture driver 12 that takes the kernel stream of the data and sends it through a capture source filter 18 via a kernel stream proxy. An optional Software Developer's Kit (SDK) module 20 may enable development of user applications 22.

The data that may be extracted from the DVB may comprise, without limitation, IP (Internet protocol) data over DVB, such as but not limited to, bit-streams, byte-streams, headers of SI, MPEG files and packets, e-mail and many others. The data may be part of a DVB-compliant transport stream that may be carried over satellite, cable, or terrestrial digital transmission systems or any other suitable communication system.

FIG. 1 illustrates sending video data for user applications 22.

Figure 2:
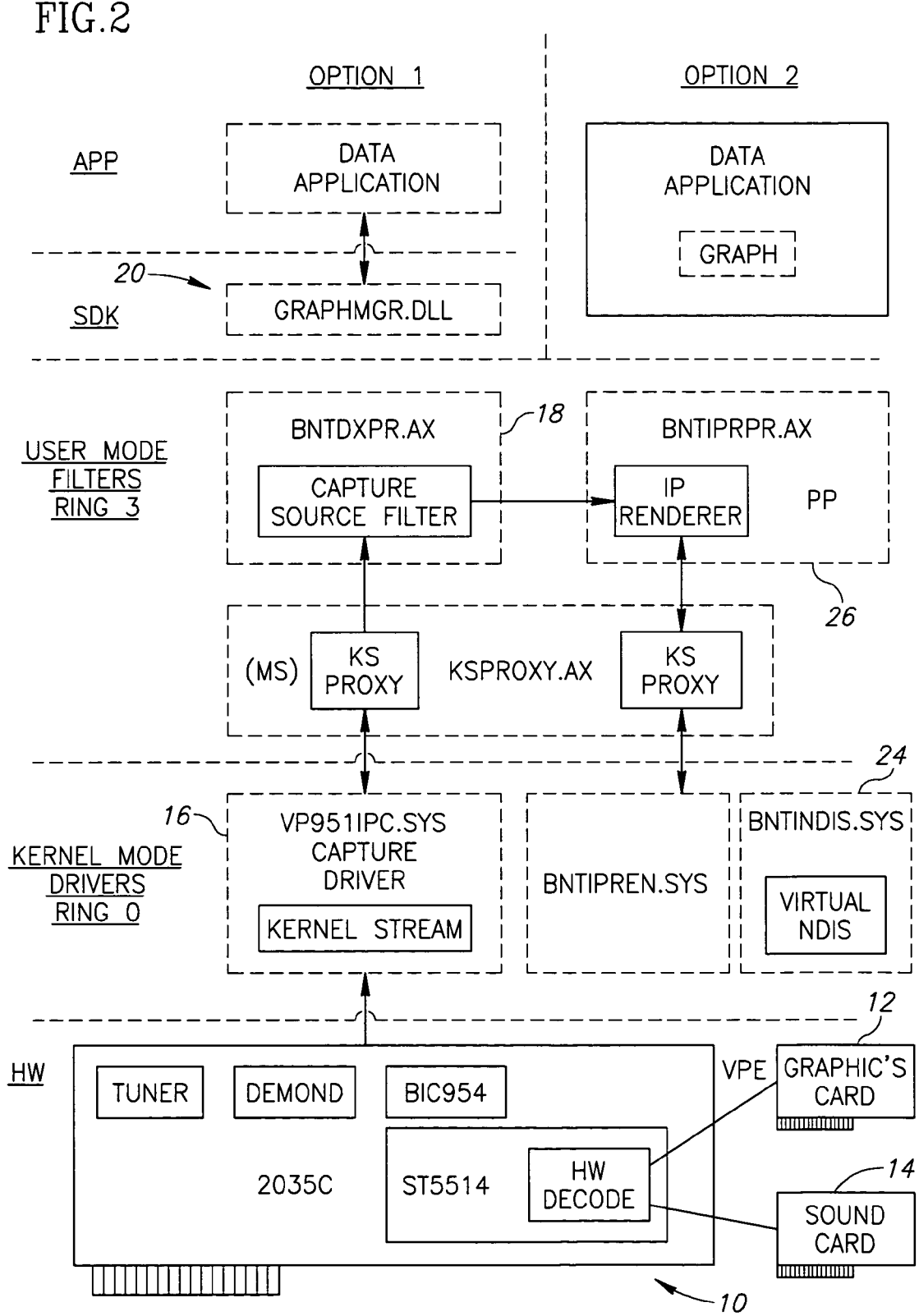
FIG. 2 is a simplified block diagram illustration of apparatus and methods for utilizing SI in DVB, in accordance with another embodiment of the present invention.

Reference is now made to FIG. 2, which illustrates sending any kind of data for user applications 22. In this embodiment, a Virtual Network Driver Interface Specification (NDIS) module 24 may be included in the kernel mode driver in addition to the capture driver 12. The system may include a transmission control protocol (TCP) software component or an Internet protocol (IP) software renderer component 26 for retrieving and sending packages or blocks of information in a particular format.

The data from the SI may be sent to a host 18, such as that resident in a PC, to be processed and used by a user for further actions. In addition, without limitation to the present invention, metadata may be processed to provide the user with HyperText Transfer Protocol (HTTP) to access websites on the world wide web portion of the Internet, cookies, that is, software that is deposited upon the hard drive of the PC for accessing a website, HyperText Markup Language (HTML) document information, Uniform Resource Locators (URLs), or website addresses, java scripts, JPEG, etc.

The user (or the system itself in an automatic or semi-automatic mode) may then initiate actions, such as browser related actions, e-commerce related actions, e-mail related actions, etc. These actions may be performed online or offline, and may or may not be performed simultaneously while enjoying the video/audio content of the DVB.

What is claimed is:

1. Apparatus comprising:
   hardware for receiving DVB (digital video broadcasting), said hardware comprising set-top box (STB) circuitry, a tuner, a demodulator and interface circuitry, said DVB including service information (SI);
   a parser for parsing video and audio content of the DVB; and
   a capture driver adapted to extract the SI of the DVB, wherein said capture driver is adapted to take a kernel stream of data from the DVB and pass the data through a capture source filter via a kernel stream proxy, and wherein said data that is extracted from the DVB comprises IP (internet protocol) data over DVB comprising at least one of bit-streams, byte-streams, headers of SI, MPEG files and packets, and e-mail for use with at least one of graphic applications, HyperText Markup Language (HTML) document information, Uniform Resource Locators (URLs), website addresses, java scripts, JPEG, browser related actions, e-commerce related actions, and e-mail related actions.

2. Apparatus according to claim 1, further comprising a Software Developer's Kit (SDK) module in communication with the capture driver, adapted to develop user applications.

3. Apparatus according to claim 1, further comprising graphics circuitry to which the video content of the DVB is sent.

4. Apparatus according to claim 1, further comprising sound circuitry to which the audio content of the DVB is sent.

5. Apparatus according to claim 1, further comprising a Virtual Network Driver Interface Specification (NDIS) module.

6. Apparatus according to claim 1, wherein said hardware has an automatic or semi-automatic mode that initiates browser related actions.

7. Apparatus according to claim 1, wherein said hardware has an automatic or semi-automatic mode that initiates e-commerce related actions.

8. Apparatus according to claim 1, wherein said hardware has an automatic or semi-automatic mode that initiates e-mail related actions.

\* \* \* \* \*